Patented July 2, 1940

2,206,066

UNITED STATES PATENT OFFICE 2,206,066

PROCESS OF TREATING BEERS AND ALES

Leo Wallerstein, New York, N. Y.

No Drawing. Application March 24, 1937, Serial No. 132,711. Renewed September 30, 1939

7 Claims. (Cl. 99—48)

This invention relates to a process of treating beers and ales.

It is well known in the brewing industry that gradual changes take place in the flavor, taste, color, brilliancy and other properties of beers and ales after packaging. Since considerable time may elapse before consumption, more particularly in the case of bottled and canned beers, these changes or instability often seriously affect the product.

It is believed that these changes are caused, at least to a large extent, by oxidation reactions which take place in the beverage after packaging, the extent of change depending on such factors as time, temperature, exposure to light, the presence of catalysts, the opportunity of the beverage to contact air, such as the air in container head spaces, and the like.

The undesirable effects of time are greatly accelerated by certain factors and may even be substantially immediate. For example, a short interval of direct sunlight will have a pronounced effect, causing more or less haziness and often affecting the flavor. It has also been found that during pasteurization beers and ales are particularly susceptible to the development of a deterioration of flavor, presumably caused by oxidation accelerated by higher temperatures, this change being evidenced by what is known as the "pasteurized taste." Even slight increases over normal pasteurizing temperatures or intervals often result, either immediately or subsequently, in so pronounced a "pasteurized taste" as to render the product of inferior quality and at times even unsaleable. In addition, pasteurizing often tends to change the color of the beer or ale, causing it to have a reddish tinge which is considered undesirable.

Attempts have been made to remedy these conditions by reducing the air content of the containers. While these attempts have been successful to a certain extent, the problem still presents difficulties. Furthermore, it is not always practicable to remove or attempt to remove all or substantially all of the air present.

Attempts have also been made to remedy the conditions mentioned by introducing into the beer sulfites or bisulfites, for example, potassium metalbisulfite. Such attempts, however, have not been successful. Whatever effect such bisulfites and the like may have, they do not, as shown by tests, solve the problem because they do not stabilize the beer or ale against the deteriorating changes above mentioned.

It is an object of the present invention to provide a method of so treating beers and ales that they will retain their original flavor, taste, color, brilliancy and other desirable characteristics over relatively long storage periods, even when pasteurized and even when packaged in containers having head spaces holding substantial quantities of air. In other words, it is an object of the invention to provide a method of so treating beers and ales as to tend to stabilize them against the deleterious effects of light, heat and oxidation reactions.

I have found that certain substances, when added to the beer or ale, even in small quantities, prevent or retard in a high degree the reactions responsible for the changes above referred to so that the original flavor, taste, appearance, etc. of the beer or ale can be maintained over long periods of time, even though substantial amounts of air are present in the containers.

In carrying out the invention to what is now considered the best advantage I add to the beer or ale a suitable amount of sodium hydrosulphite ($Na_2S_2O_4$.)

The hydrosulfite may be added in various amounts. The amount should be sufficient to attain the end in view and not so great as to cause a deleterious effect on the taste or flavor of the beer. I have found that the desired results may be obtained by the use of relatively small proportions of this added material. For example, suitable and satisfactory results are obtained by adding the hydrosulphite in amounts ranging from about 10 to 100 parts per million or in amounts ranging from about 1 to 10 grams per barrel of 31 gallons of beer or ale.

The hydrosulphite may be added at substantially any stage in the preparation of the beer or ale after the wort has been subjected to boiling. For example, the addition may be made before fermentation; during fermentation; after fermentation and before vat storage; or after vat storage and before pasteurization. Moreover, the total amount of material to be added need not be added at one time, it being possible to add fractions of the total amount at different times and stages. I prefer, however, to add the hydrosulphite at one time, after fermentation and before pasteurization.

It is to be understood that the invention is not limited to the use of sodium hydrosulphite. Other salts of hydrosulphurous acid, particularly other alkali metal salts, such as potassium hydrosulphite, may be used. I may also use sulfoxylates and aldehyde and ketone derivatives of hydrosulphurous acid.

When beers and ales are treated as above described, any tendency toward a reddish color is prevented or corrected, at least to a high degree, and the beer or ale has a proper color. In fact, I have found suprisingly, that even the relatively small quantities of hydrosulfites above referred to are sufficient to produce a visible lightening effect on the color of the beer. Colloidal instability (haziness), due to the effects of oxidation, is avoided or corrected, at least to a great extent, and the beer or ale has proper brilliancy. As a result of the addition of the material or materials referred to, the beer or ale is protected against the effects of heat, thus preventing "pasteurized taste;" against the effects of light; and against the effects of the presence of air, thus preventing the deleterious effects of oxidation reactions even over long periods of storage prior to consumption.

What is claimed is:

1. The method of treating beers and ales to give the same a high degree of stability to the effects of light, heat and oxidation reactions, which comprises adding to the beer or ale a salt of hydrosulphurous acid.

2. The method of treating beers and ales to give the same a high degree of stability to the effects of light, heat and oxidation reactions, which comprises adding to the beer or ale an alkali metal hydrosulphite.

3. The method of treating beers and ales to give the same a high degree of stability to the effects of light, heat and oxidation reactions, which comprises adding to the beer or ale sodium hydrosulphite.

4. The method of treating beers and ales to give the same a high degree of stability to the effects of light, heat and oxidation reactions, which comprises adding to the beer or ale sodium hydrosulphite in the relative proportion of less than 100 parts per million.

5. The method of treating beers and ales to give the same a high degree of stability to the effects of light, heat and oxidation reactions, which comprises adding to the beer or ale sodium hydrosulphite in the relative proportion of approximately 1 to 10 grams per 31 gallons.

6. The method of treating beers and ales to give the same a high degree of stability to the effects of light, heat and oxidation reactions, which comprises adding to the beer an agent selected from the group consisting of salts of hydrosulphurous acid, sulfoxylates and aldehyde and ketone derivatives of hydrosulphurous acid.

7. The method of treating beers and ales to give the same a high degree of stability to the effects of light, heat and oxidation reactions, which comprises adding to the beer or ale an alkali metal hydrosulfite, said hydrosulfite being added in fractional amounts at different times after boiling of the wort and before pasteurization.

LEO WALLERSTEIN.